H. M. WELCH.
Culinary Steamer.

No. 164,063. Patented June 1, 1875.

WITNESSES
Mary J. Utley,
Geo. E. Upshaw.

INVENTOR
H. M. Welch,
Chipman Hosmer & Co
ATTORNEYS

THE GRAPHIC CO.PHOTO-LITH.39 & 41 PARK PLACE, N.Y.

UNITED STATES PATENT OFFICE.

HARLOW M. WELCH, OF COWANSVILLE, CANADA.

IMPROVEMENT IN CULINARY STEAMERS.

Specification forming part of Letters Patent No. 164,063, dated June 1, 1875; application filed April 3, 1875.

*To all whom it may concern:*

Be it known that I, HARLOW M. WELCH, of Cowansville, in the county of Missisquoi and Province of Quebec, Dominion of Canada, have invented a new and valuable Improvement in Cooking-Utensils; and I do hereby declare that the following is a full, clear, and exact description of the construction and operation of the same, reference being had to the annexed drawings, making a part of this specification, and to the letters and figures of reference marked thereon.

Figure 1:
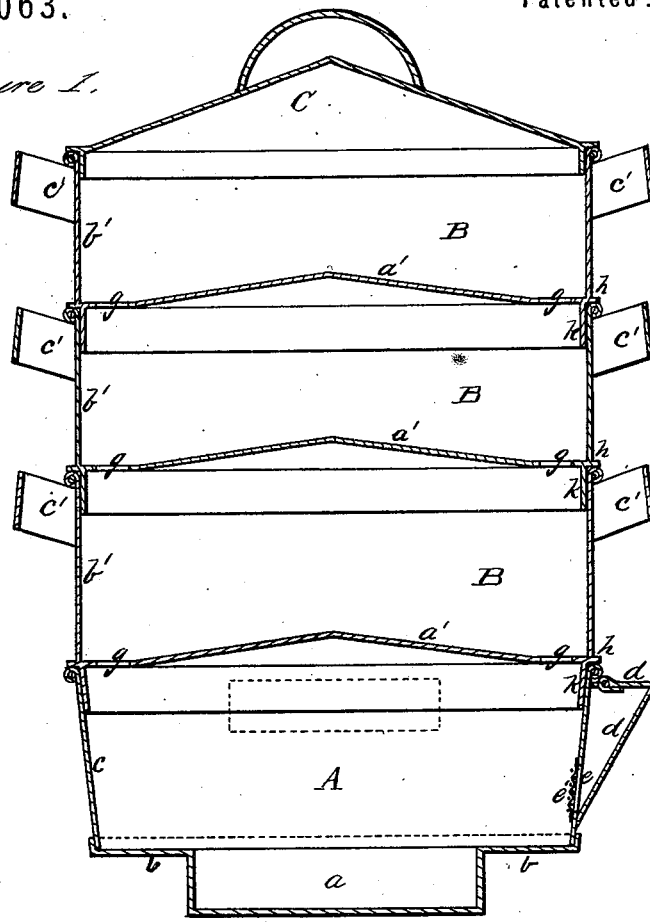
Figure 2:
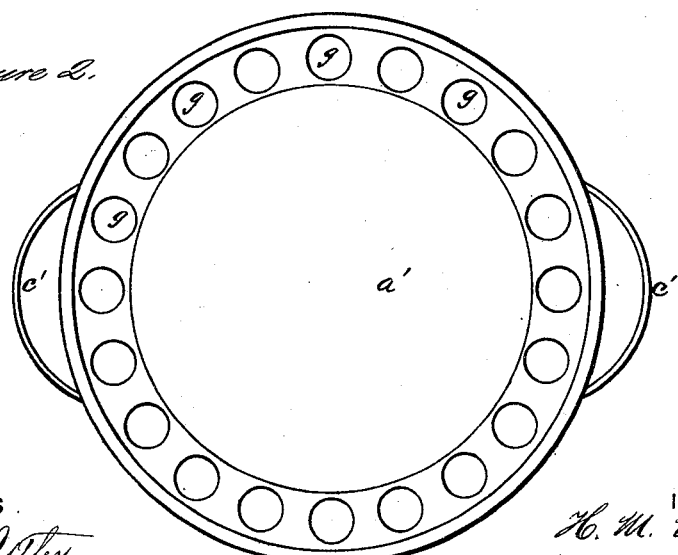

Figure 1 of the drawing is a representation of a vertical central section of my steam-cooker, and Fig. 2 is a plan view of the same.

This invention has relation to steam culinary utensils; and it consists in the construction and novel arrangement of a series of interchangeable vessels or sections, each having a concavo-convex bottom, rising in the center and shelving toward the rim, and perforated with an annular series of holes next the rim, which is provided with an exterior bearing-flange to rest on the lip of the section below, said series being in connection below with a base-section adapted to hold water and to sustain the heat of a fire, and above with a cover or lid, which forms the common top to the utensil thus constructed, as hereinafter fully shown and described.

In the accompanying drawings, the letter A indicates the lowest or base section, which is constructed with a central depression, $a$, designed to be introduced into the pot-hole, for the double purpose of bringing the heating-surface of the utensil as near to the fire as possible, and of securing the base as firmly and steadily as it can be done, on account of its height and consequent liability to accident. From the base $b$ of this pan rises the rim $c$, which may be flared somewhat outward. A spout, $d$, is secured to the outside of this rim, an opening, $e$, being provided at its lower portion for the introduction of water through a strainer, $e'$, which covers the opening. The spout is provided with a lid, $d'$, to prevent the undue escape of steam in this direction. Each section is provided with two opposite handles, $c'$, as generally the utensils will be of sufficient capacity to contain pans and other vessels holding the provisions to be cooked. The letter B indicates the interchangeable sections, of which there may be any convenient number, not differing from each other, except, perhaps, that some may be more shallow than others. Each section consists of a rim or wall, $b'$, and a concavo-convex bottom, $a'$, rising centrally and shelving off in a conical manner toward the rim. Next the rim this bottom becomes more level, and is perforated all around with an annular series of holes, $g$. On the outside of each section is provided a flange, $h$, which is designed to bear on the lip of the section below when the vertical flange $k$, below said flange $h$, is introduced into the rim of said section. The diameters of the sections and flanges to be inserted are all similar, so that either section may be connected with any other, or with the base-section A, and so that the lid will fit any section or said base-vessel. C indicates the cover, having a concavo-convex top rising centrally, like the bottoms of the perforated or intermediate sections. The handles of this cover are attached to the top thereof, on each side, as shown in the drawings. As the sections are interchangeable with regard to order, there is no necessary observance of their successive relation in placing one upon the other, and, when not required, one or more of them may be left out of the utensil when in use. The steam-boiler or lower vessel has a copper bottom.

When in use the provisions to be steamed are placed in suitable vessels in the sections B. The steam will rise through the perforations in the outer portions of the bottoms of the sections and cook the articles in the dishes. The condensation will take place upon the convex bottoms, and run down to and through the holes near the rim; also, upon the concave under surfaces of said bottoms, which are directly over the provisions; and in this location, also, it will run down the inclined conical surface to the rim, whence it will pass through the perforations back to the boiler or base-pan. Therefore there is no danger of the water of condensation falling upon the food and contaminating it with the flavor of other food which may be cooking in other sections of the utensil.

When the water is introduced into the boiling-pan, it is highly desirable that it should be clean, and hence the strainer is used at the insertion of the spout.

What I claim as new, and desire to secure by Letters Patent, is—

In a steam cooking-utensil, the sections B B, each having a concavo-convex bottom, $a'$, provided with a series of drip-holes, $g$, extending entirely around the outer edges of said bottom and flange $k$, whereby said sections may be interchangeably fitted into each other and the base-section, and the water of condensation be carrried back into the boiler without coming in contact with the materials to be cooked, substantially as described.

In testimony that I claim the above I have hereunto subscribed my name in the presence of two witnesses.

HARLOW MINER WELCH.

Witnesses:
  O. N. E. BOUCHER,
  LOUIS DÉRY.